Oct. 3, 1967         E. G. HOLLOWELL         3,344,585
METHOD FOR RECOVERING AMMONIA FROM GASEOUS MIXTURE
Filed May 12, 1967
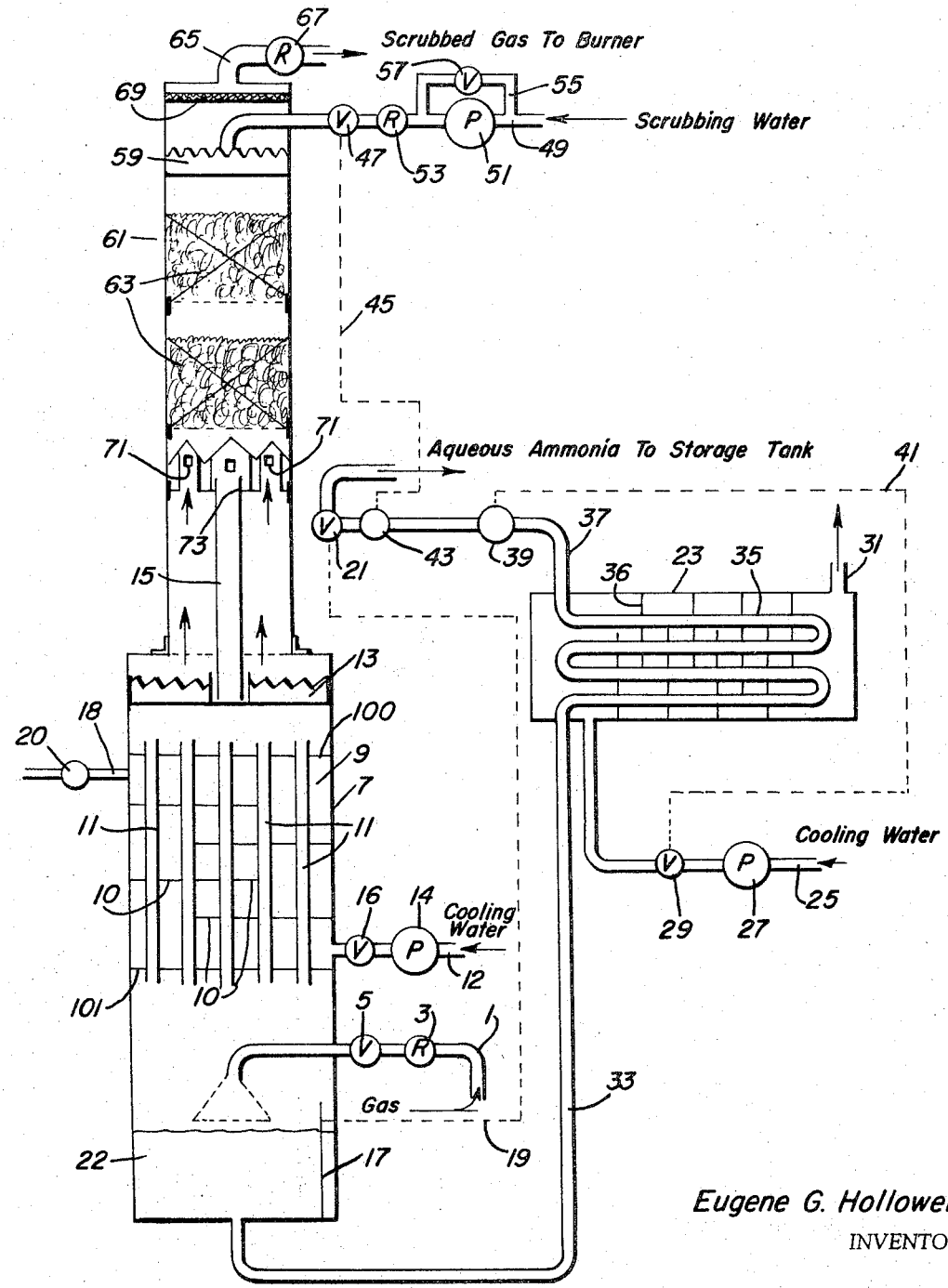
Eugene G. Hollowell
INVENTOR
BY Kenneth E. Prince
ATTORNEY / 3,344,585
METHOD FOR RECOVERING AMMONIA FROM
GASEOUS MIXTURE
Eugene G. Hollowell, 13163 Fourposter Court,
St. Louis, Mo. 63141
Filed May 12, 1967, Ser. No. 638,040
10 Claims. (Cl. 55—70)

ABSTRACT OF THE DISCLOSURE

Ammonia is recovered from a gaseous mixture containing about 10–30 mole percent $NH_3$, by scrubbing the gaseous mixture under a pressure of at least about 200 p.s.i.a. in water-cooled tubes of a wetted-wall scrubber with a first aqueous solution of ammonia (ca. 3–10% $NH_3$) to form a second aqueous solution of ammonia (ca. 23–27% $NH_3$) which is recovered; gas from the wetted-wall scrubber is scrubbed with water in a packed column to form the first aqueous solution of ammonia, and a scrubbed effluent gas of low ammonia content, all as described hereinafter.

---

This invention is in the field of gas absorption.

In summary, this invention is directed to a method for recovering at least 95% of the ammonia present in a first gaseous mixture consisting essentially of about 10–30 mole percent ammonia and about 90–70 mole percent inert gas, said inert gas consisting essentially of a mixture of hydrogen, methane, nitrogen, and argon with the hydrogen and methane components comprising at least about 50 mole percent of said first gaseous mixture, said method comprising: (a) passing a stream of said first gaseous mixture at a pressure of at least about 200 p.s.i.a. through a wetted-wall scrubber having scrubbing tubes in which said gaseous mixture is scrubbed with a countercurrent stream of a first aqueous solution of ammonia said first aqueous solution being prepared in a later-recited scrubbing step and consisting essentially of about 3–10 weight percent ammonia and about 97–90 weight percent water, while cooling said scrubbing tubes externally with water to maintain the temperature of the aqueous ammonia solution within the tubes below about 110° F., to form therein a second aqueous solution consisting essentially of about 23–27 weight percent ammonia and about 77–73 weight percent water and a second gaseous mixture consisting essentially of about 1–6 mole percent ammonia and about 99–94 mole percent of the aforesaid inert gas; (b) recovering the second aqueous solution; (c) passing the second gaseous mixture at a pressure of at least about 200 p.s.i.a. through a packed scrubbing column where said gaseous mixture is scrubbed with a countercurrent stream of water to form the aforesaid first aqueous solution of ammonia and a third gaseous mixture consisting essentially of about 0.1–0.5 mole percent ammonia and about 99.9–99.5 mole percent of the aforesaid inert gas; (d) passing the first aqueous solution to the wetted-wall scrubber; and (e) removing the third gaseous mixture from the packed scrubbing column.

The drawing is a schematic representation of apparatus and material flow of a preferred embodiment of the instant invention.

Preferred embodiments of this invention are directed to a method for recovering at least 95% of the ammonia present in a first gaseous mixture consisting essentially of about 10–30 mole percent ammonia and about 90–70 mole percent inert gas, said inert gas consisting essentially of a mixture of hydrogen, methane, nitrogen, and argon with the combined hydrogen and methane components (i.e., the hydrogen component plus the methane component) comprising at least about 50 mole percent of said first gaseous mixture, said method comprising:
(a) passing a stream of said first gaseous mixture at a pressure of at least about 200 p.s.i.a. through a wetted-wall scrubber having scrubbing tubes in which said gaseous mixture is scrubbed with a countercurrent stream of a first aqueous solution of ammonia, said first aqueous solution being prepared in a later-recited scrubbing step and consisting essentially of about 3–10 weight percent ammonia and about 97–90 weight percent water, while cooling said scrubbing tubes externally with water to maintain the temperature of the aqueous ammonia solution within the tubes below about 110° F., to form therein a second aqueous solution consisting essentially of about 23–27 weight percent ammonia and about 77–73 weight percent water and a second gaseous mixture consisting essentially of about 1–6 mole percent ammonia and about 99–94 mole percent of the aforesaid inert gas;
(b) recovering the second aqueous solution; (c) passing the second gaseous mixture at a pressure of at least about 200 p.s.i.a. through a packed scrubbing column where said gaseous mixture is scrubbed with a countercurrent stream of water to form the aforesaid first aqueous solution of ammonia and a third gaseous mixture consisting essentially of about 0.1–0.5 mole percent ammonia and about 99.9–99.5 mole percent of the aforesaid inert gas;
(d) passing the first aqueous solution to the wetted-wall scrubber; and (e) removing the third gaseous mixture from the packed scrubbing column, in which process:

(1) The ammonia content of the first gaseous mixture is about 16–20 mole percent;
(2) The ammonia content of the second gaseous mixture is about 3–5 mole percent;
(3) The ammonia content of the third gaseous mixture is about 0.2–0.3 mole percent;
(4) The ammonia content of the first aqueous solution of ammonia is about 5–8 weight percent;
(5) The ammonia content of the second aqueous solution of ammonia is about 24–26 weight percent;
(6) The third gaseous mixture is burned in a furnace having heat exchange means therein, and heat values are recovered from such burning;
(7) The second aqueous solution is cooled to about 90–100° F. before recovering said solution;
(8) The packed scrubbing column is operated adiabatically; and
(9) The first aqueous solution of ammonia leaves the packed scrubbing column at about 130–150° F.

In the synthesis of ammonia from hydrogen and nitrogen under pressure and in the presence of a catalyst there is usually produced one or more streams comprising ammonia mixed with inert gas. These streams usually contain from about 10 to about 30 mole percent ammonia with the remainder being inert gas. By inert gas is meant a gas such as hydrogen, nitrogen, methane, and argon which is neither acidic nor basic in its reaction and which is substantially insoluble or very slightly soluble in water and in aqueous ammonia solution when such solution is at about atmospheric pressure or at a pressure up to about 20 or 25 atmospheres and at temperatures ranging from about 50° F. to about 160° F. In ammonia plants these streams usually contain about 50 mole percent or more of combustible gases selected from the group consisting of hydrogen and methane. For example, a typical gas stream consisted essentially of about 17.5 mole percent ammonia, 48.2 mole percent hydrogen, 18.6 mole percent nitrogen, 5.3 mole percent argon, and 10.4 mole percent methane; another typical stream consisted essentially of 14.8 mole percent ammonia, 50.6 mole percent hydrogen, 16.3 mole percent nitrogen, 4.0 mole percent argon, and 14.3 mole percent methane.

Several other similar streams have been found to contain about 25–26 mole percent ammonia, 9–10 mole percent ammonia, and 15–16 mole percent ammonia, respectively.

The process of my invention constitutes a substantial economic and technical advance because said process makes it possible to recover at least 95% of the ammonia (as an aqueous solution analyzing about 23–27 weight percent ammonia) present in a first gaseous mixture consisting essentially of about 10–30 mole percent ammonia and about 90–70 mole percent inert gas (the inert gas consisting essentially of a mixture of hydrogen, methane, nitrogen, and argon with the combined hydrogen and methane components (i.e., the hydrogen component plus the methane component) comprising at least 50 mole percent of the first gaseous mixture) more economically and with simpler and less costly apparatus than would be possible with processes of the prior art.

Where reporting the analysis of gaseous mixtures, or the composition of such mixtures, the values are reported in mole percents, and, where dealing with wet, or moist, gases the analysis is corrected to a dry basis. Further, the analysis always adds up to 100 percent. Thus, if a mixture consists essentially of about 10–30 mole percent ammonia and about 90–70 mole percent inert gas it is understood that the total must be 100 percent. In other words, if the mixture consists essentially of 10 percent ammonia it also consists essentially of 90 percent inert gas and if said mixture consists essentially of 25 percent ammonia it consists essentially of 75 percent of inert gas.

The process of my invention can best be illustrated by referring to the drawing which is a schematic representation of the apparatus and material flow of a preferred embodiment of my invention.

The gaseous mixture from which ammonia is to be absorbed enters the scrubbing system via line 1, pressure regulator 3, and valve 5. The gas then passes upward through the tubes 11 of wetted-wall scrubber 7, said tubes being cooled externally by contact with cooling water in heat exchanger section 9 of wetted-wall scrubber 7; the cooling water entering the system via line 12, pump 14, and valve 16. The water passes through heat exchange section 9 where it is deflected by baffles 10 and exits from the heat exchange section via line 18 and temperature measuring means 20.

Dilute ammonia scrubbing solution enters the wetted-wall scrubbing system via pipe 15 and distributor 13. The aforesaid scrubbing solution is an aqueous solution of ammonia consisting essentially of about 3–10 weight percent $NH_3$ and about 97–90 weight percent water. This solution flows down the inner surfaces, or walls, of tubes 11 where it contacts the gas passing upward through said tubes and dissolves ammonia from the gas, thereby to form an ammonia solution consisting essentially of about 23–27 weight percent ammonia and about 77–73 weight percent water. This ammonia solution collects in storage section 22 which is below and communicating with the tubes 11 of wetted-wall scrubber 7. Level control means 17 communicates via electrical line 19 with electrically controlled valve 21, thereby to regulate the level of aqueous ammonia in reservoir 22. Ammonia solution from reservoir 22 passes via line 33 to heat exchanger 23 where said liquid flows through tubes 35 which are cooled by water which enters the heat exchanger via line 25, pump 27, and valve 29, said valve 29 being an electrically operated valve which is controlled by temperature measuring means 39 which communicates via electrical line 41 with valve 29. The rate of water flow through the heat exchanger is thus automatically controlled to maintain the temperature of the aqueous ammonia leaving the heat exchanger to a desired temperature which is generally within the range of about 90–100° F., preferably 90° F. Heat exchanger 23 is provided with baffles 36. Water exits said heat exchanger via exit line 31. The cooled ammonia solution leaves heat exchanger 23 via line 37 where it passes through the aforesaid temperature measuring means 39 and then through density measuring means 43 and valve 21 from which said ammonia solution passes to ammonia storage tanks (not shown).

Density measuring means 43 communicates via electrical line 45 with electrically operated valve 47 which regulates the rate at which scrubbing water is fed into packed scrubbing tower 61. Gas from wetted-wall scrubber 7 passes to packed scrubbing column 61.

In the drawing the packed scrubbing tower is shown on top of the wetted-wall scrubber; however, this is not necessary because packed scrubbing column 61 could also be placed near (or even below) wetted-wall scrubber 7, gas exit wetted-wall scrubber 7 could be piped to the bottom of packed scrubbing column 61, and scrubbing liquid from the bottom of scrubbing tower 61 could be pumped to liquid distributor 13 of wetted-wall scrubber 7.

Gas passes into packed scrubbing column 61 via gas inlet ports 71 and upward through the packing shown at 63. In the drawing two distinct sections of packing are shown. This is desirable because it permits better distribution of scrubbing liquor on the packing; however, it is possible to use one continuous packing. The packing can be Raschig rings, Berl saddles, lumps of coke, Pall rings, or the like. Scrubbing water (distilled water, deionized water, or other highly pure water substantially free of material such as iron salts, aluminum salts, acid materials, and the like which would react with ammonia) passes via line 49, pump 51, pressure regulator 53, and valve 47 to distributor 59. The pumping circuit is shown with a bypass 55 containing a valve 57. This bypass is convenient, but it is not essential to the operation of the process of my invention. Valve 47 is, as stated supra, an electrically controlled valve which communicates via electrical line 45 with density measuring means 43, thereby to control the quantity of water added to the scrubbing system and consequently the concentration and density of the aqueous ammonia produced by scrubbing the ammonia-containing gas in the process of my invention. Distributor 59 is shown as a notched weir. Other types of distributors such as weirs with holes in the bottom thereof, bucket distributors, overflow distributors, and the like can also be used in the process of this invention.

Water passes from distributor 59 onto packing 63 where such water contacts the ammonia-containing gas passing upward through the packed column, thereby to form an aqueous solution of ammonia which passes via outlet means 73 and line 15 to distributor 13 of the aforesaid wetted-wall scrubber. Distributor 13 is shown as a notched weir. This is a preferred distributor for use in the process of my invention. However, other types of distributors (such as those discussed supra) can be used, but I prefer to use a notched weir. Distributor 13 is positioned so that it does not discharge scrubbing liquor directly into any of the tubes 11 of wetted-wall scrubber 7. On the contrary, said distributor discharges scrubbing liquor in a pattern which causes the liquor to be distributed over the surface of upper tube sheet 100 of wetted-wall scrubber 7.

Gas from the packed scrubbing column passes through entrainment separator 69 which can be conventional wire gauze, wire screen with steel wool, steel shavings, or the like placed thereon, or a series of screens placed one above the other, or the like. The thus scrubbed gas passes via line 65 and pressure letdown valve 67 to a burner which is not shown where the combustible components (hydrogen and methane) of the scrubbed gas are burned. I prefer to burn the combustible components of the scrubbed gas in a furnace which has heat exchange means therein so that I can recover heat values by the combustion of such gas.

In the above-reported embodiment valves 21, 29, and 47 were electrically controlled. I have obtained excellent results in runs where said valves were pneumatically controlled. In such runs lines 19, 41, and 45 were pneumatic lines. It will, on the basis of the above disclosure, be readily apparent to those skilled in the art that pneumatic control can be used on some of said valves while using electrical control on other valves. For example, valve 21 can be electrically controlled while using pneumatic control on valves 29 and 47.

The process of this invention is further illustrated by the following non-limiting example.

EXAMPLE I

The material flow and apparatus used in this example are represented schematically in the drawing.

A gaseous mixture consisting essentially of about 14.8 mole percent ammonia, 50.6 mole percent hydrogen, 16.3 mole percent nitrogen, 4.0 mole percent argon, and 14.3 mole percent methane was used. Said gaseous mixture was fed into a wetted-wall scrubber at the rate of 3,983.8 lbs. per hour corresponding to an ammonia feed rate of 836.8 lbs. per hour. This gaseous mixture entered the scrubber at 70° F. under a pressure of 240 p.s.i.a. Pure water (deionized water) was fed into the top of a packed scrubbing column at the rate of 2,407 lbs. per hour; said water was fed into the system at a temperature of 80° F. Aqueous ammonia analyzing 26 weight percent NH$_3$ and having a temperature of 100° F. was produced at the rate 3,218 lbs. per hour. Gas leaving the packed scrubbing column had a temperature of 105° F. and said gas analyzed 0.3 mole percent NH$_3$.

Cooling water was fed to the heat exchange portion of the wetted-wall scrubber at the rate of 160 gallons per minute. Said cooling water had an inlet temperature of 86° F. and an outlet temperature of 93° F. Gas leaving the wetted-wall scrubber (gas entering the packed scrubbing column) analyzed 4.3 mole percent ammonia and had a temperature of 100° F. Ammonia solution leaving the packed scrubbing column (ammonia solution fed to the wetted-wall scrubber) contained 7.7 weight percent ammonia and had a temperature of about 145° F.

The thus prepared aqueous ammonia solution which, as stated supra, contained 26 weight percent ammonia, was recovered and piped to an aqueous ammonia storage tank. Gas from the packed scrubbing column was piped to a furnace, said furnace having heat exchange means, where the combustible components (hydrogen and methane) of said gas were burned to recover heat values.

The following table gives more details concerning the above-reported run.

Table I

| | Performance data |
|---|---|
| Feed gas: | |
| Flow— | |
| Lb. moles hr. | 332.0 |
| Lbs. hr. | 3983.8 |
| Mole percent NH$_3$ | 14.8 |
| Ammonia content, lbs. hr. | 836.8 |
| Temperature, ° F. | 70 |
| Pressure, p.s.i.a. | 240 |
| Deionized water— | |
| Lbs./hr. | 2407 |
| G.p.m. (gallons per minute) | 4.81 |
| Temperature, ° F. | 80 |
| Product liquid: | |
| Flow— | |
| Lbs./hr. | 3218 |
| G.p.m. | 7.2 |
| Temperature, ° F. | 100 |
| Ammonia concentration, wt. percent | 26 |
| Overhead gas: | |
| Flow, lb. moles/hr. | 285 |
| Mole percent NH$_3$ | 0.3 |
| Overhead gas: | |
| NH$_3$, lbs./hr. | 14.5 |
| Temperature, ° F. | |
| Cooling water to wetted-wall section: | |
| Flow, g.p.m. | 160 |
| Inlet temperature, ° F. | 86 |
| Outlet temperature, ° F. | 93 |
| Duty of wetted-wall section, B.t.u./hr. | 565,000 |
| Gas to packed section: | |
| Mole percent NH$_3$ | 4.3 |
| Temperature, ° F. | 100 |
| Aqueous ammonia solution from packed section: | |
| Weight percent NH$_3$ | 7.7 |
| Temperature, ° F. | 145 |

In this specification the expression "lb. moles/hr." means pound moles per hour; the expression "lbs./hr." means pounds per hour; the expression "p.s.i.a." means pounds per square inch absolute pressure; the expression "g.p.m." means gallons per minute; the expression "wt. percent" means weight percent; the expression "B.t.u./hr." means British thermal units per hour; and the expressions "lb." and "lbs." means pound and pounds, respectively.

I have found that, in order to prepare an aqueous ammonia solution having an ammonia concentration of about 23–27% it is necessary to pass the first gaseous mixture through the wetted-wall and packed column scrubbers at a pressure not less than about 200 p.s.i.a. Theoretically, there is no upper limit on the pressure at which the first gaseous mixture can be fed into the wetted-wall scrubber. However, economic considerations render it impractical to use pressures much above about 300 p.s.i.a. This is true because it is costly to compress gas to higher pressures and specially designed scrubbing apparatus must be used at high pressure.

The aqueous ammonia produced by the process of this invention has given excellent results where used as a direct application fertilizer. It has also been diluted to prepare an excellent household ammonia solution, and it has been used, with excellent results, as a nitrogen source in the preparation of granular fertilizers.

Various modifications of the above-described process will, as a result of my disclosure which is presented herein, be readily apparent to those skilled in the art. For example, manual operation rather than automatic control can be used to control the liquid level in reservoir 22, the rate that scrubbing water is added to the scrubbing system via line 49, the rate that cooling water is added to heat exchanger 23 via line 25, and automatic control, rather than manual operation (or control), can be used to regulate the rate that cooling water is added to heat exchanger section 9 of the wetted-wall scrubber via line 1.

What is claimed is:
1. A method for recovering at least 95% of the ammonia present in a first gaseous mixture consisting essentially of about 10–30 mole percent ammonia and about 90–70 mole percent inert gas, said inert gas consisting essentially of a mixture of hydrogen, methane, nitrogen, and argon with the hydrogen and methane components comprising at least about 50 mole percent of said first gaseous mixture, said method comprising:
    (a) passing a stream of said first gaseous mixture at a pressure of at least about 200 p.s.i.a. through a wetted-wall scrubber having scrubbing tubes in which said gaseous mixture is scrubbed with a countercurrent stream of a first aqueous solution of ammonia, said first aqueous solution being prepared in a later-recited scrubbing step and consisting essentially of about 3–10 weight percent ammonia and about 97–90 weight percent water, while cooling said scrubbing tubes externally with water to maintain the temperature of the aqueous ammonia solution with- in the tubes below about 110° F., to form therein a second aqueous solution consisting essentially of about 23–27 weight percent ammonia and about 77–73 weight percent water and a second gaseous mixture consisting essentially of about 1–6 mole percent ammonia and about 99–94 mole percent of the aforesaid inert gas;

(b) recovering the second aqueous solution;

(c) passing the second gaseous mixture at a pressure of at least about 200 p.s.i.a. through a packed scrubbing column where said gaseous mixture is scrubbed with a countercurrent stream of water to form the aforesaid first aqueous solution of ammonia and a third gaseous mixture consisting essentially of about 0.1–0.5 mole percent ammonia and about 99.9–99.5 mole percent of the aforesaid inert gas;

(d) passing the first aqueous solution to the wetted-wall scrubber; and (e) removing the third gaseous mixture from the packed scrubbing column.

2. The process of claim 1 in which the ammonia content of the first gaseous mixture is about 16–20 mole percent.

3. The process of claim 1 in which the ammonia content of the second gaseous mixture is about 3–5 mole percent.

4. The process of claim 1 in which the ammonia content of the third gaseous mixture is about 0.2–0.3 mole percent.

5. The process of claim 1 in which the ammonia content of the first aqueous solution of ammonia is about 5–8 weight percent.

6. The process of claim 1 in which the ammonia content of the second aqueous solution of ammonia is about 24–26 weight percent.

7. The process of claim 1 in which the third gaseous mixture is burned in a furnace having heat exchange means therein and heat values are recovered from such burning.

8. The process of claim 1 in which the second aqueous solution is cooled to about 90–100° F. before recovering said solution.

9. The process of claim 1 in which the packed scrubbing column is operated adiabatically.

10. The process of claim 1 in which the first aqueous solution of ammonia leaves the packed scrubbing column at about 130–150° F.

References Cited

UNITED STATES PATENTS 1,999,546  4/1935  Pyzel _____ 55—70

REUBEN FRIEDMAN, Primary Examiner.

C. N. HART, Assistant Examiner.